H. DOUCHAMP.
GLASS FURNACE.
APPLICATION FILED SEPT. 20, 1916.
1,298,474.
Patented Mar. 25, 1919.
4 SHEETS—SHEET 1.
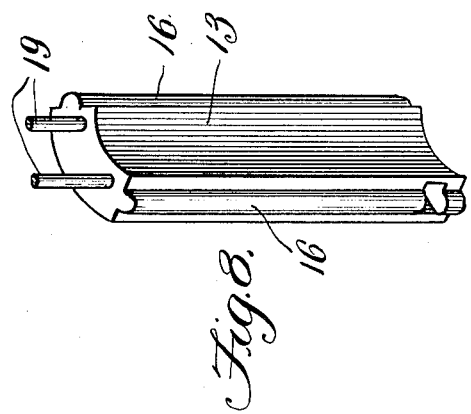
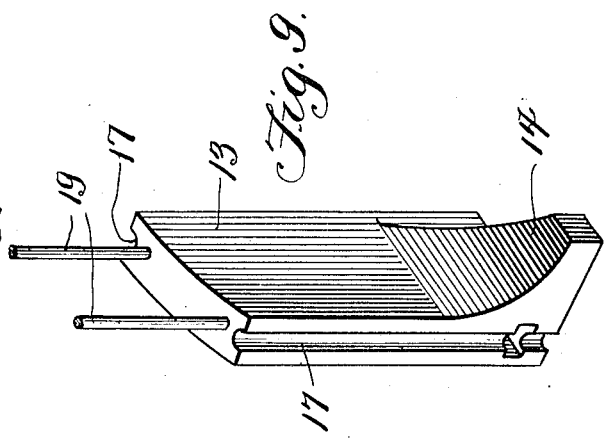
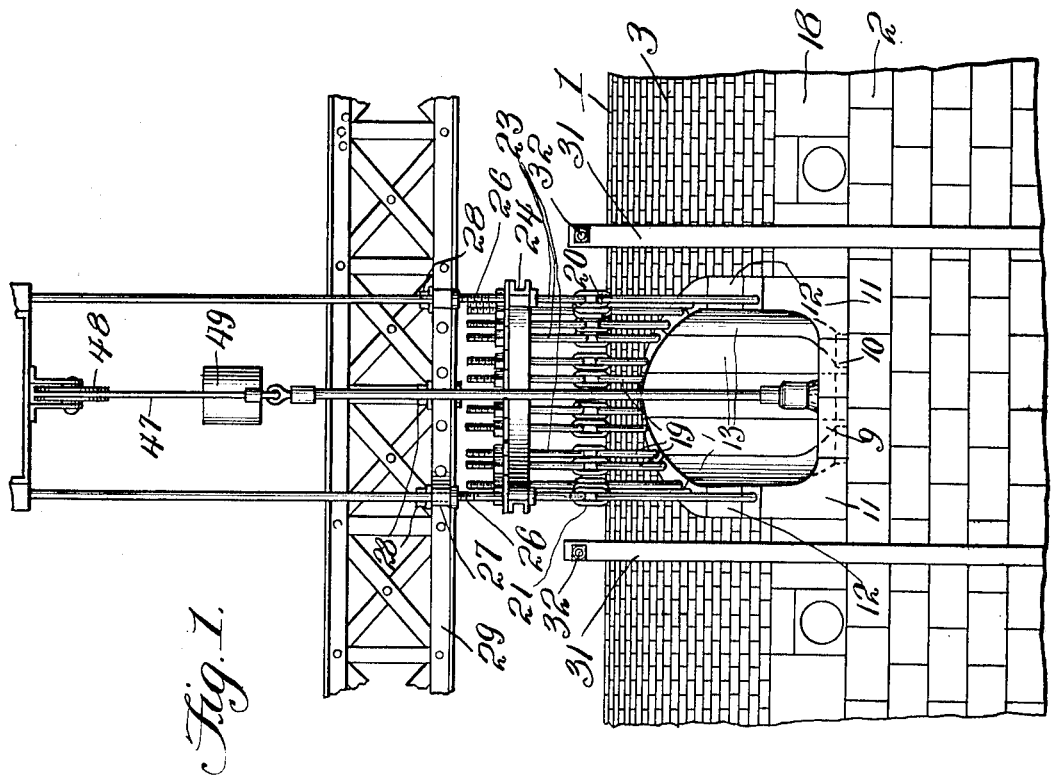
Inventor
Henry Douchamp
By Victor J. Evans
Attorney
Witness

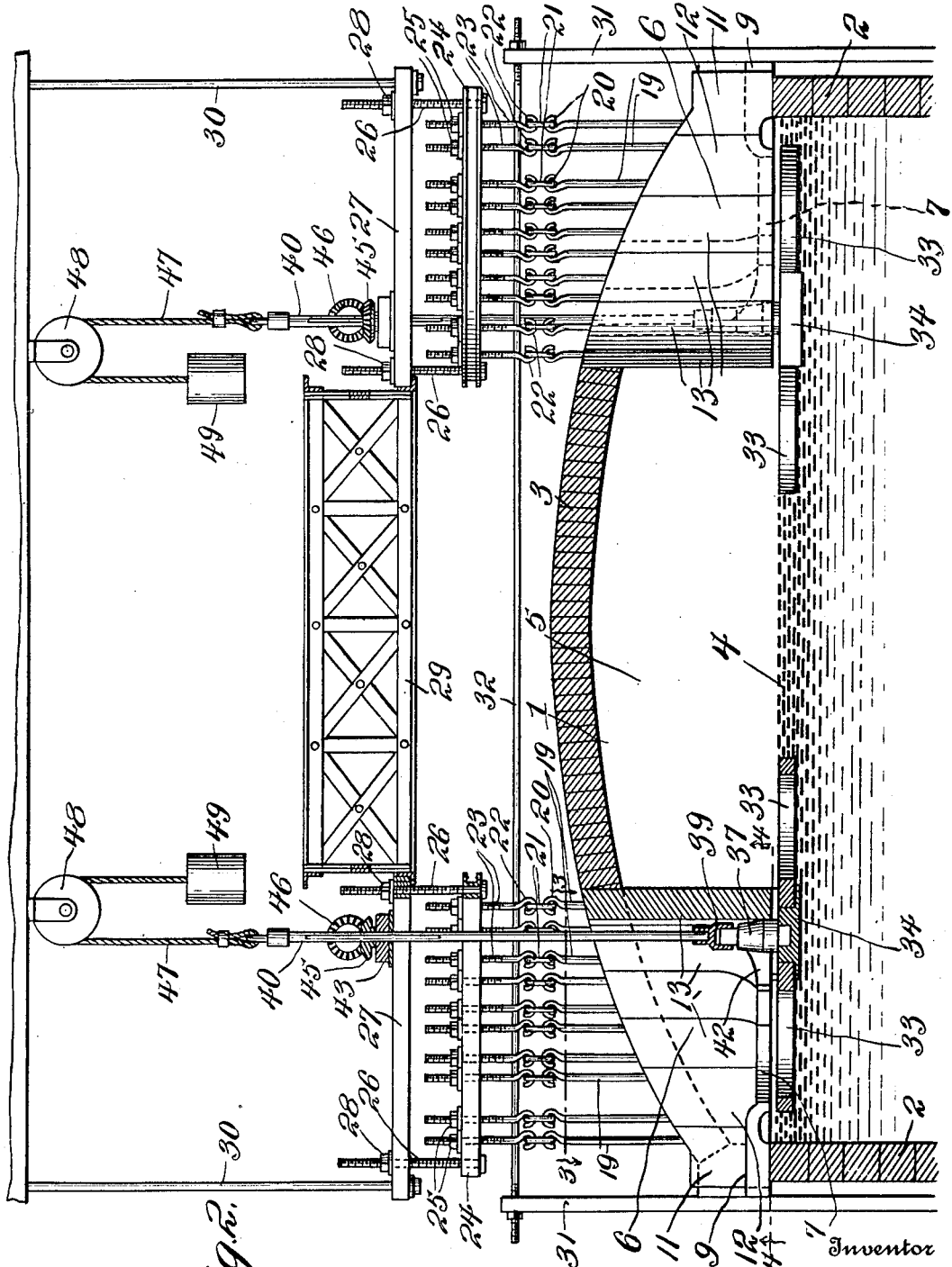

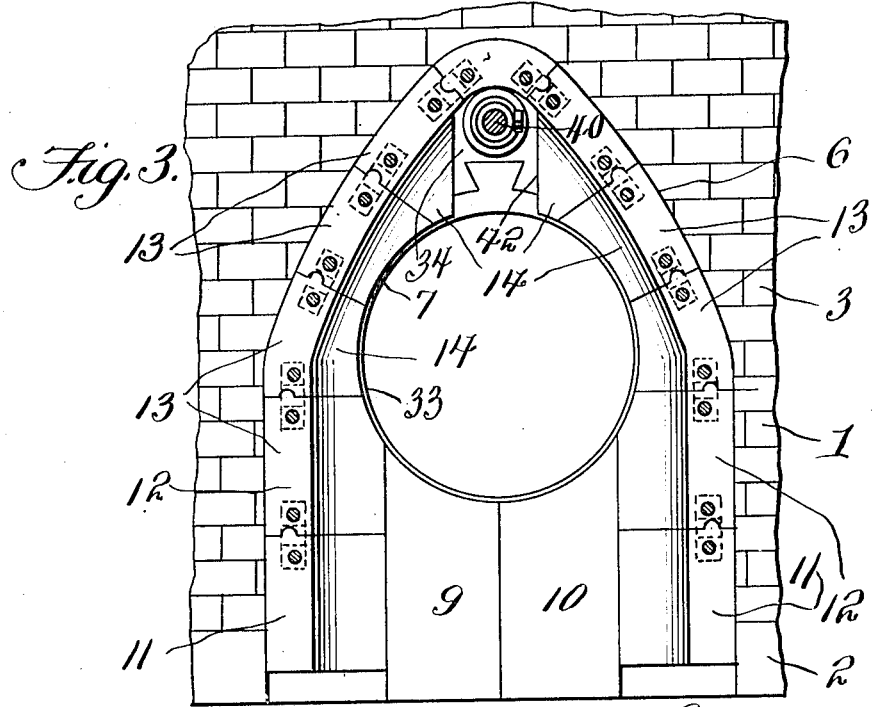
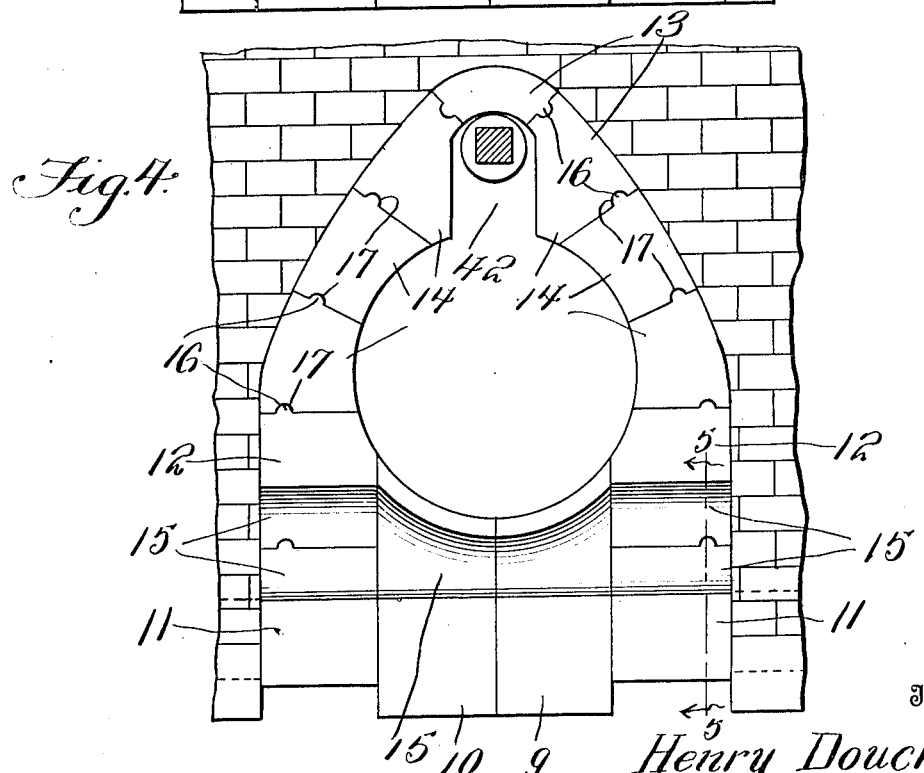

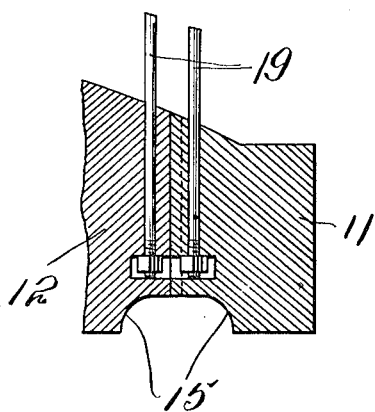
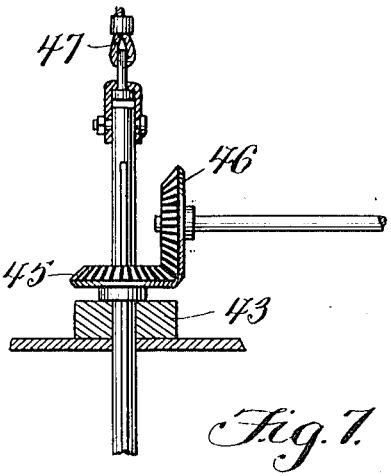
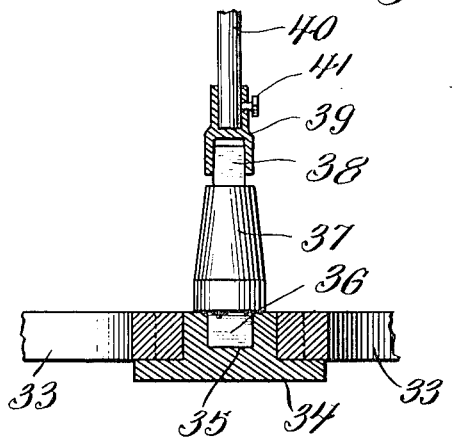
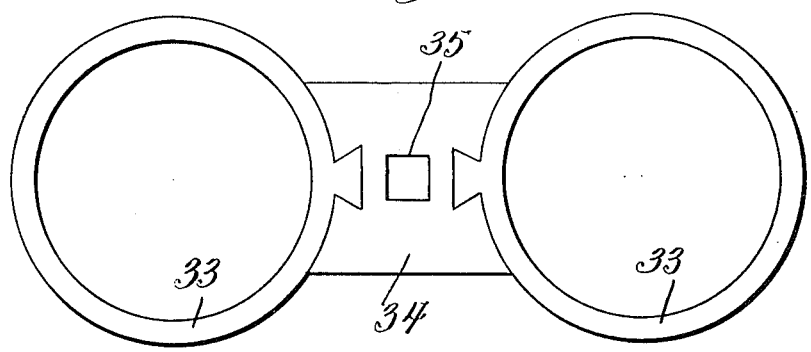

UNITED STATES PATENT OFFICE.

HENRY DOUCHAMP, OF SMETHPORT, PENNSYLVANIA, ASSIGNOR TO SMETHPORT GLASS CO., OF SMETHPORT, PENNSYLVANIA.

GLASS-FURNACE.

1,298,474.     Specification of Letters Patent.     Patented Mar. 25, 1919.

Application filed September 20, 1916. Serial No. 121,222.

*To all whom it may concern:*

Be it known that I, HENRY DOUCHAMP, a citizen of the United States, residing at Smethport, in the county of McKean and State of Pennsylvania, have invented new and useful Improvements in Glass-Furnaces, of which the following is a specification.

This invention relates to an improvement in glass furnaces, and is particularly directed to a construction for facilitating the proper withdrawal of the material from the furnace.

In manufacturing window glass by machinery it has been practically impossible from the commercial standpoint to draw the glass from the furnace without spoiling a large amount of material, owing to the necessity for cooling and reheating incident to the use of such apparatus as has been generally known in the art.

The present invention is particularly designed to obviate to a large extent the above noted disadvantage and to so arrange for the drawing of the material from the furnace as to insure a natural cooling of the glass in drawing and a natural reheating of the material after severance of the cylinder, thereby insuring a uniform result and perfecting to a commercial success the manufacture of window glass by machinery.

The present invention is also particularly designed to provide certain improvements in the construction of the elements forming the drawing opening, whereby the arrangement of the parts may be varied according to natural or intended varying levels of the glass within the furnace from which the cylinders are drawn.

The invention will be described in the following specification, reference being had particularly to the accompanying drawings, in which:—

Figure 1 is a fragmentary front elevation of the furnace looking toward the drawing opening and showing a part of the overhead frame structure.

Fig. 2 is a section taken longitudinally through the furnace between the drawing openings at opposite sides or ends thereof.

Fig. 3 is a sectional plan view taken substantially on the line 3—3 of Fig. 2.

Fig. 4 is a horizontal section on the line 4—4 of Fig. 2, looking upward from the surface of the glass toward the drawing opening.

Fig. 5 is a longitudinal section on the line 5—5 of Fig. 4.

Fig. 6 is a top plan view of the carrier drawing rings on an enlarged scale.

Fig. 7 is a vertical section through the body of the carrier and the means for rotating the same, showing particularly the construction of such means.

Figs. 8 and 9 are perspective detail views of some of the tiles used in the construction of the drawing chamber.

Referring now more particularly to the drawings, 1 designates a furnace, which may be of any suitable form in plan and provided with any desired number of drawing stations. In the present instance I have shown the body of the furnace as including a breast wall 2 and a top or cap wall 3, within which furnace is arranged the body of molten glass 4 from which the cylinders are to be drawn. The top wall 3 is preferably mounted or dome-shaped, being of maximum height at the center to form a heating chamber 5 of maximum depth centrally of the furnace and above the level of the central portion of the body of molten glass 4.

Each drawing station 6 is formed by a chamber or recess in a sloping portion of the wall 3 contiguous to the wall 2, by the use of tiles of special construction, which are constructed and arranged to provide a drawing opening 7 in normal proximity to the surface of the glass. This drawing opening 7 is circular in form and disposed at the base of the recess or chamber, which recess or chamber is substantially of oblong rectangular form, in plan outwardly beyond a transverse line intersecting the center of the drawing opening, and of tapering or arched form in plan and inwardly beyond the central transverse line of the opening, which form of the chamber or recess is designed to secure certain advantages, as hereinafter fully described.

The outer or front wall of the drawing recess or chamber is formed by a pair of base tiles 9 and 10, resting directly upon the wall 2, and side tiles 11 and 12, which abut against the outer surfaces of said base tiles, while the side and inner or back walls of the said chamber or recess are formed by a series of tiles 13 varying in height or depth progressively from front to rear in proper accordance with the gradual increase in depth of the chamber between the front and rear extremities of the chamber. The tiles which form the rear half of the walls of the drawing chamber have their surfaces sloping toward the opening 7, which is formed by inwardly extending segemental portions 14 of the tiles fitting closely together in abutting relation. The inwardly extending portions of the tiles 9, 10, 11 and 12 also are formed with registering grooves in their lower faces coöperating to provide a transverse flue in front of the drawing opening and extending completely across the drawing station from side to side, to provide for the passage of heat between the wall of the drawing opening and the wall 2, to maintain all of the surrounding surfaces substantially at a uniform heat, whereby the glass in position to be drawn will be maintained at substantially the same consistency throughout and prevented from becoming chilled, as a result of which imperfections in the glass disposed in position to be drawn will be avoided.

The respective tiles 9 to 13, inclusive, are made of some suitable heat resisting material and are detachably and adjustably mounted in position, said tiles having their adjacent faces formed with tongue and groove connections 16 and 17, whereby they are slidably connected and held from relative lateral displacement, the construction being such as to permit of the introduction or removal of the tiles 9 and 10 in a horizontal direction and the insertion, removal and adjustment of the tiles 11, 12, and 13 in a vertical direction. The tiles 9, 10, 11 and 12 are supported by the wall 2, and between terminal blocks or tiles 18 also resting upon the said wall 2 and directly supporting the wall 3; the tiles 13, and also the tiles 11 and 12 are individually connected to the lower ends of suspending rods 19, varying in length throughout the series according to the length of said tiles, and anchored at their lower ends therein in any suitable manner. At their upper ends the rods 19 are provided with hooks 20 which are connected by links 21 with the hooked lower ends 22 of suspending bolts 23, whereby all of the tiles 13 are supported in position at a determined level with respect to the level of the surface of the body of glass 4.

The bolts 23 pass through a suspending bar 24 and are supplied with nuts 25, whereby they may be individually adjusted, to vary the height or level of each tile as occasion may require, while by vertically adjusting the bar 24 it will be evident that all of the rods 19, and consequently all of the tiles 11, 12 and 13, may be adjusted as a body or in unison, to vary the height of the said tiles and level of the drawing opening 7 according to the natural or intended height or level of the body of glass 4 as circumstances occur or may require at different times in the operation of the furnace. The bar 24 is suspended by main bolts 26 from a superposed beam 27, which bolts are provided with adjusting nuts 28 for the purpose of adjusting the bar for the purpose described. The beams 27 of the oppositely disposed drawing stations may be attached to a connecting girder 29, and the parts of the overhead structure thus far described may be supported by rods 30 from an overhead support or frame of any suitable kind. As shown in the present instance, bracing supports or uprights 31 are disposed upon the outside of the wall 2 and are united by tie rods 32, by means of which the walls of the furnace are braced and reinforced in one of the several ways commonly employed.

It will thus be seen that by the described construction of the drawing chamber a wall is provided above the drawing opening to partially inclose and protect the lower portion of the cylinder as it is drawn from cooling drafts of air, and the tiles composing these walls are adjustable to vary the level of the drawing opening to accord with the varying levels of the glass at different periods, the construction of the chamber of rectangular form beyond the transverse center of the drawing opening giving free access, when desired, to an attendant to perform various operations in or about the drawing chamber; while the tapering contour of the drawing chamber inside the vertical line of the transverse center of the drawing opening and the inverted semi-frusto-conical shape of the inner half of the chamber, arising from the sloping contour of the tiles, giving maximum strength and durability so that the tiles will have to a determined degree a self supporting action, thus reducing the amount of strain falling upon the overhead structure. The inner half of the drawing chamber being of semi-elliptical form in general contour and in plan also economizes in the use of tiles, in carrying out certain features of the invention, as hereinafter fully described.

For the purpose of seggregating portions of the glass for drawing actions, I provide a pair of oppositely disposed drawing rings 32 made of clay or other heat resisting material and detachably connected with a rotary carrier or spider 34 which is arranged to float upon the surface of the body of glass 4 within the furnace chamber. The said carrier or spider is formed with an angular socket or recess 35 to receive the reduced angular end or projection 36 of a stem 37 having an upper angular end or projection 38 to fit within an angular socket 39 upon the lower end of a rotary shaft or rod 40, to which said socket is fixedly secured as shown at 41, the construction thus being such that by turning the rod or shaft the carrier may be rotated to successively bring each ring in position for a drawing action, while the other or companion ring is arranged so as to be exposed to the heating influence of the hot glass and air in the body of the furnace to melt the aftermath therefrom which has resulted from the previous draw.

The stem projects upward through the passage 42 in the bottom portions of the tiles immediately forming the apex of the arched portion of the drawing chamber, which allows the axis of the spider to be disposed at an intermediate point between the drawing opening 7 and chamber 5, so that by giving the carrier a half rotation the rings may be simultaneously and alternately moved into and out of drawing and heating positions, respectively. This arrangement of the passage 42 is gained, without the trouble and expense of using a semi-circular wall of tiles 13, by giving said walls a tapered or arched conformation as before described, the arrangement being such as to dispose the passage 42 between the apex of the arch and the center rear portion of the drawing opening. The rod or shaft 40 is slidably and rotatably mounted in a bearing 43 disposed upon the bar 27 and is feathered to slide through and rotate with a gear 45 receiving motion from a gear 46 driven from any suitable source of power whereby the carrier and rings may be turned or rotated when required. At its upper end the rod or shaft is attached to a cable 47 passing over a guide pulley 48 and having a depending end provided with a counterweight 49, whereby the weight of the rod or shaft may be substantially counterbalanced and removed from the carrier and rings, allowing said carrier and rings to float easily upon the surface of the glass and without the necessity of carrying the weight of the rod. It will, of course, be understood, that the rod or shaft may be adjusted vertically to vary the working level of the carrier and rings according to the working level of the glass and may be detached from the intervening rotary stem in a ready and convenient manner to permit removal or replacement of the carrier and rings as occasion may require at different periods in the use of the apparatus. By the provision of the stem 37, which is made of some suitable refractory material, and the weight of which is carried by the rod, a stem of sufficient length to project some distance above the surface of the molten glass in the furnace may be employed without the imposition of undue weight upon the carrier and rings. By thus using a stem of some length the socket and rod may be connected therewith at a comparatively high point above the surface of the glass so as to protect the same from the intense heat, as will be readily understood.

It is, of course, understood that the connection between the stem and the socket of the carrier operating shaft is such as to permit the carrier and rings to remain at all times floating in the body of the glass independent of the height or level of the same, and that the stem will be of such height as to permit coöperation of the socket in any position of the carrier.

In operation the carrier operating shaft is actuated to arrange one of the rings in alinement with the drawing opening, and the drawing apparatus, which may be of any desired type, is then operated to draw through the ring and opening the desired quantity of material, which will be in the form of a cylinder of the desired length. After severing the drawn portion from the ring, a quantity of material will remain within and somewhat beyond the ring which has been subjected to a cooling action, and which is commonly known as the aftermath. Immediately succeeding the drawing operation the operating shaft is again actuated to bring the other ring in alinement with the drawing opening, whereby the ring from which the previous draw has been made will be moved into the heating chamber, wherein the glass adhering to the ring will be subjected to the intense heat and remelted and purified, thus clearing the ring for the next drawing out operation.

It will be apparent from the above description that the carrier may be continuously rotated in one direction or rotatively reciprocated a portion of a revolution, with the object of bringing the proper ring in alinement with the drawing opening and disposing the other ring or rings in the heating chamber, it being understood, of course, that any number of rings may be employed, two being shown in the present instance, as a matter of convenience.

It will be evident from the construction described, that the invention provides means for securing a more efficient and reliable drawing operation, since the operating shaft and component parts will be protected against injury from the heat, while the construction of the connection between the carrier and shaft and the described mode of mounting the tiles forming the drawing chamber will permit of the arrangement of the parts to suit varying levels of the body of glass within the furnace under different conditions of service.

It will be evident that the links 24 allow the suspending rods to be independently detached from the bolts 23, so that any of the tiles may be removed and replaced, when damaged or otherwise injured, without disturbing the other tiles.

I claim:—

1. In a glass drawing apparatus including a furnace having a drawing portion comprising tiles constructed to form a drawing opening, said tiles being vertically adjustable to vary the level of the opening; means for moving said tiles comprising a main supporting frame, an auxiliary frame disposed below said main supporting frame and vertically adjustably supported therefrom, and a plurality of supporting members connected with said auxiliary frame and with the respective tiles, said last named members being individually adjustable in respect to said auxiliary frame.

2. In a glass drawing apparatus, a furnace having a drawing portion formed of tiles constructed to provide a drawing opening, a main supporting frame, an auxiliary frame disposed below and vertically adjustably connected with said main frame, a plurality of supporting rods vertically adjustably connected with said auxiliary frame, and a plurality of supporting rods connected with said tiles and flexibly connected with said last named supporting rods, whereby the position of said tiles may be varied individually in respect to said auxiliary frame, movement of said auxiliary frame varying the positions of all the tiles simultaneously.

In testimony whereof I affix my signature.

HENRY DOUCHAMP.